United States Patent
Lee et al.

(10) Patent No.: US 8,515,185 B2
(45) Date of Patent: Aug. 20, 2013

(54) ON-SCREEN GUIDELINE-BASED SELECTIVE TEXT RECOGNITION

(75) Inventors: Dar-Shyang Lee, Union City, CA (US);
Lee-Feng Chien, Taipei (TW); Aries Hsieh, Xindian (TW); Pin Ting, SanChong (TW); Kin Wong, Languna (HK)

(73) Assignee: Google Inc., Mountain View, CA (US)

( * ) Notice: Subject to any disclaimer, the term of this patent is extended or adjusted under 35 U.S.C. 154(b) by 854 days.

(21) Appl. No.: 12/626,520

(22) Filed: Nov. 25, 2009

(65) Prior Publication Data
US 2011/0123115 A1     May 26, 2011

(51) Int. Cl.
G06K 9/72     (2006.01)
G06K 9/46     (2006.01)
G06K 9/66     (2006.01)
G06K 9/20     (2006.01)

(52) U.S. Cl.
USPC ............ 382/229; 382/190; 382/231; 382/282

(58) Field of Classification Search
USPC ................. 382/185, 190, 229, 231, 254, 255, 382/282, 296, 301
See application file for complete search history.

(56) References Cited

U.S. PATENT DOCUMENTS

| | | | |
|---|---|---|---|
| 5,224,180 A | 6/1993 | Tadokoro | |
| 5,237,627 A * | 8/1993 | Johnson et al. | 382/198 |
| 5,252,951 A | 10/1993 | Tannenbaum et al. | |
| 5,321,520 A | 6/1994 | Inga et al. | |
| 5,465,317 A * | 11/1995 | Epstein | 704/236 |
| 5,796,406 A | 8/1998 | Shigematsu et al. | |
| 5,850,480 A | 12/1998 | Scanlon | |
| 5,880,743 A | 3/1999 | Moran et al. | |
| 5,889,518 A | 3/1999 | Poreh et al. | |
| 5,960,448 A | 9/1999 | Reichek et al. | |
| 6,115,482 A | 9/2000 | Sears et al. | |
| 6,249,283 B1 * | 6/2001 | Ur | 715/764 |
| 7,447,362 B2 * | 11/2008 | Lev | 382/200 |
| 7,496,230 B2 * | 2/2009 | Chen et al. | 382/182 |
| 7,593,605 B2 | 9/2009 | King et al. | |
| 7,627,142 B2 | 12/2009 | Kurzweil et al. | |
| 7,689,613 B2 | 3/2010 | Candelore | |
| 7,809,192 B2 * | 10/2010 | Gokturk et al. | 382/176 |
| 7,830,362 B2 | 11/2010 | Finley | |
| 7,990,561 B2 * | 8/2011 | Okabe | 358/1.15 |
| 8,103,099 B2 * | 1/2012 | Andel et al. | 382/181 |

(Continued)

OTHER PUBLICATIONS

"Babelshot Kitchen," Blog posts on posterous.com, 8 pages, [online] [Retrieved on Mar. 26, 2010] Retrieved from the Internet <URL:http://babelshot.posterous.com/>.

(Continued)

*Primary Examiner* — John Strege
(74) *Attorney, Agent, or Firm* — Fenwick & West LLP

(57) ABSTRACT

A live video stream captured by an on-device camera is displayed on a screen with an overlaid guideline. Video frames of the live video stream are analyzed for a video frame with acceptable quality. A text region is identified in the video frame approximate to the on-screen guideline and cropped from the video frame. The cropped image is transmitted to an optical character recognition (OCR) engine, which processes the cropped image and generates text in an editable symbolic form (the OCR'ed text). A confidence score is determined for the OCR'ed text and compared with a threshold value. If the confidence score exceeds the threshold value, the OCR'ed text is outputted.

25 Claims, 10 Drawing Sheets

(56) References Cited

U.S. PATENT DOCUMENTS

| | | | |
|---|---|---|---|
| 8,139,257 | B2 | 3/2012 | Fabrice |
| 8,144,990 | B2 | 3/2012 | Englund et al. |
| 8,155,444 | B2 | 4/2012 | Simmons et al. |
| 8,231,389 | B1 | 7/2012 | Berger et al. |
| 8,320,708 | B2 | 11/2012 | Kurzweil et al. |
| 2001/0056352 | A1 | 12/2001 | Xun |
| 2002/0037107 | A1 | 3/2002 | Trachtman |
| 2002/0191847 | A1* | 12/2002 | Newman et al. ............. 382/176 |
| 2003/0218070 | A1 | 11/2003 | Tsikos et al. |
| 2005/0128181 | A1* | 6/2005 | Wang et al. .................. 345/156 |
| 2006/0098899 | A1 | 5/2006 | King et al. |
| 2007/0133074 | A1 | 6/2007 | Fabrice |
| 2007/0280534 | A1* | 12/2007 | Foss ............................. 382/182 |
| 2008/0233980 | A1* | 9/2008 | Englund et al. .............. 455/466 |
| 2009/0009532 | A1 | 1/2009 | Hallberg |
| 2010/0331043 | A1 | 12/2010 | Chapman et al. |
| 2011/0069089 | A1 | 3/2011 | Kopf et al. |
| 2011/0069180 | A1 | 3/2011 | Nijemcevic et al. |
| 2011/0123115 | A1 | 5/2011 | Lee et al. |
| 2012/0131520 | A1 | 5/2012 | Tang et al. |
| 2012/0163668 | A1* | 6/2012 | Englund et al. .............. 382/103 |

OTHER PUBLICATIONS

Video from "APPINN.com" demonstrating how a phone application works, 9 pages, [online] [Retrieved on Mar. 26, 2010] Retrieved from the Internet <URL:http://www.appinn.com/youdao-cidian/>.

Qiang, D., "Portable Translation of Words in Writing: new function to look up words using camera in Youdao dictionary (cell phone version), express delivery of new versions of the dictionary at the same time (referenced)," Blog post from www.163.com, Nov. 1, 2009, 6 pages, [online] [Retrieved on Mar. 26, 2010] Retrieved from the Internet <URL:http://dalong5401.blog.163.com/blog/static/10231322009101103292225/>. With English Summary.

Video from "Static.youku.com" demonstrating how a phone application works, 1 page, [online] [Retrieved on Mar. 26, 2010] Retrieved from the Internet <URL:http://static.youku.com/v1.0.0060/v/swf/qplayer.swf?VideoIDS=XMTI2MDUxNDI4&embedid=-&showAd=0>.

"Product Overview for WorldCard Mobile iPhone" Penpower Technology Ltd., 3 pages, [online] [Retrieved on Mar. 26, 2010] Retrieved from the Internet <URL:http://worldcard.penpowerinc.com/worldcard-mobile-iPhone.html>.

"Product Overview for WorldCard Mobile Windows mobile" Penpower Technology Ltd., 1 pages, [online] [Retrieved on Mar. 26, 2010] Retrieved from the Internet <URL:http://worldcard.penpowerinc.com/worldcard-mobile-standard.html>.

"iPhone's First Picture Translator," pictranslator.com, Fotozio, LLC, 2003, 2 pages, [online] [Retrieved on Mar. 26, 2010] Retrieved from the Internet <URL:http://www.pictranslator.com/index.html>.

PCT International Search Report and Written Opinion, PCT/US2010/051632, Nov. 29, 2010, 8 Pages.

PCT International Search Report and Written Opinion, PCT/US2010/051624, Nov. 30, 2010, 6 Pages.

Kavallieratou, E., et al., "Skew Angle Estimation in Document Processing Using Cohen's Class Distributions," Pattern Recognition Letters, Nov. 1999, pp. 1305-1311, vol. 20, Issues 11-23.

* cited by examiner

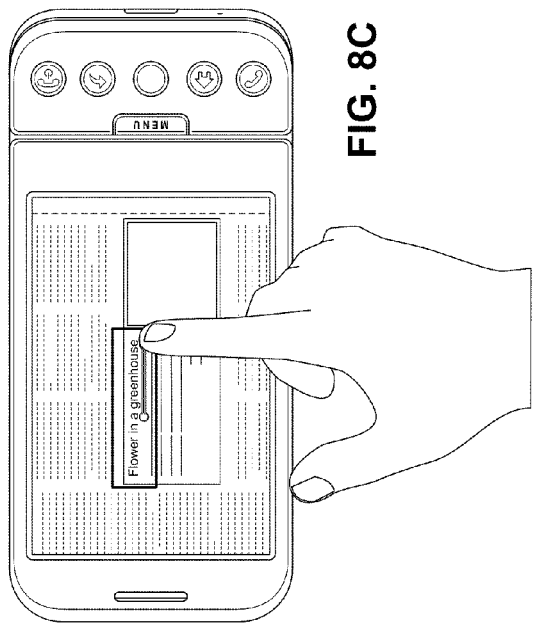
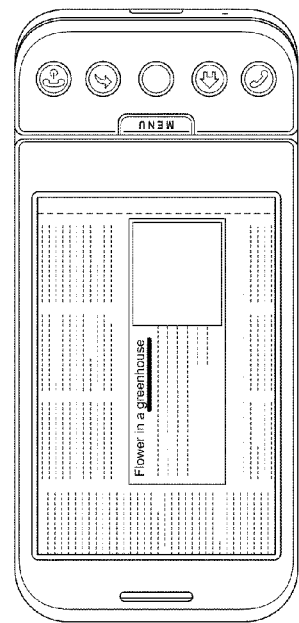
FIG. 8C
FIG. 8D
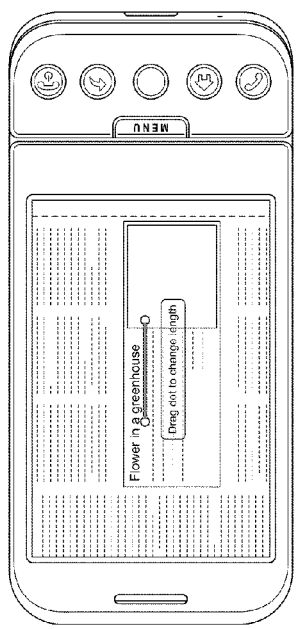
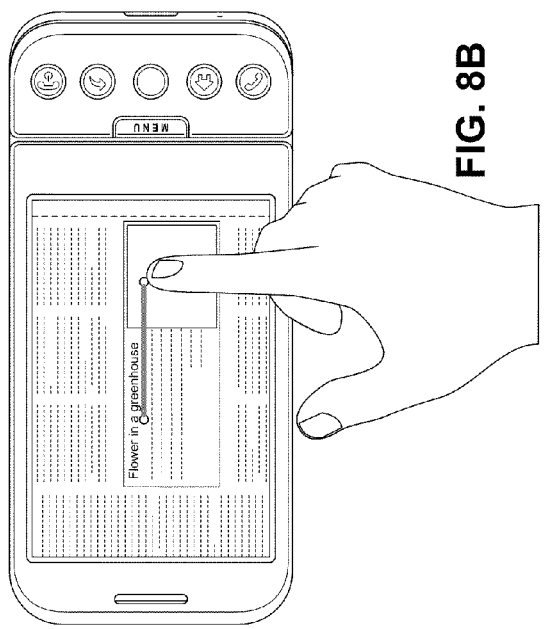
FIG. 8A
FIG. 8B

ON-SCREEN GUIDELINE-BASED SELECTIVE TEXT RECOGNITION

CROSS-REFERENCE TO RELATED APPLICATION

The present invention is related to U.S. Utility patent application Ser. No. 12/575,015, entitled "Gesture-Based Selective Text Recognition," filed on Oct. 7, 2009, the disclosure of which is hereby incorporated by reference in its entirety.

BACKGROUND

1. Field of Disclosure

The disclosure generally relates to the field of image processing, in particular to recognizing text in images using optical character recognition (OCR).

2. Description of the Related Art

Many mobile phones on the market are equipped with cameras. The camera phone users often use the equipped cameras to capture images containing text, such as business cards, road signs, logos, and printed materials. To further process the captured text, the images often are processed using Optical Character Recognition (OCR) technology to convert the text within into editable text. However, because a photo typically is fairly large in size and includes abundant textual and graphical information, the text the user is interested in, even if correctly recognized, will be hidden among other text generated from the photo. Thus, recognizing text of the user's interest using this approach is both inefficient and error prone.

Therefore, there is a need for a way to efficiently and accurately recognize the text of the user's interest that is captured by a camera phone.

SUMMARY

Embodiments of the present disclosure include a method (and corresponding system and computer program product) for selectively recognizing text in a live video stream based on an on-screen guideline.

A first aspect of the present disclosure is a computer-implemented method for selectively recognizing text in a live video stream, comprising: receiving a video frame from a camera in real time; displaying a guideline overlaid on the video frame on a display device; identifying a text region in the video frame associated with the guideline, the text region comprising text; and converting the text in the text region into an editable symbolic form.

A second aspect of the present disclosure is a computer-readable storage medium encoded with executable computer program code for selectively recognizing text in a live video stream, the computer program code comprising program code for: receiving a video frame from a camera in real time; displaying a guideline overlaid on the video frame on a display device; identifying a text region in the video frame associated with the guideline, the text region comprising text; and converting the text in the text region into an editable symbolic form.

A third aspect of the present disclosure is a computer system for selectively recognizing text in a live video stream, comprising: a computer-readable storage medium comprising executable computer program code for: a video User Interface (UI) module for receiving a video frame from a camera in real time and displaying a guideline overlaid on the video frame on a display device; a text region identification module for identifying a text region in the video frame associated with the guideline, the text region comprising text; and an OCR module for converting the text in the text region into an editable symbolic form.

A fourth aspect of the present disclosure is a computer-implemented method for converting text in a series of received images into text in an editable symbolic form, comprising: receiving a series of images from a client, the series of images comprising a first image; processing the first image using OCR functions to generate text in the editable symbolic form; determining a confidence score for the generated text based on text generated for other images in the series of images received from the client; and responsive to the confidence score exceeding a threshold value, transmitting the generated text to the client in response to the series of images.

A fifth aspect of the present disclosure is a computer-readable storage medium encoded with executable computer program code for converting text in a series of received images into text in an editable symbolic form, the computer program code comprising program code for: receiving a series of images from a client, the series of images comprising a first image; processing the first image using OCR functions to generate text in the editable symbolic form; determining a confidence score for the generated text based on text generated for other images in the series of images received from the client; and responsive to the confidence score exceeding a threshold value, transmitting the generated text to the client in response to the series of images.

A sixth aspect of the present disclosure is a computer system for converting text in a series of received images into text in an editable symbolic form, comprising: a computer-readable storage medium comprising executable computer program code for: an OCR engine for receiving a series of images from a client, the series of images comprising a first image and processing the first image using OCR functions to generate text in the editable symbolic form; and a confidence evaluation module for determining a confidence score for the generated text based on text generated for other images in the series of images received from the client and transmitting, responsive to the confidence score exceeding a threshold value, the generated text to the client in response to the series of images.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIGS. 8A through 8F are diagrams illustrating an example of adjusting an on-screen guideline and selectively recognizing text in a live video stream based on the on-screen guideline according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
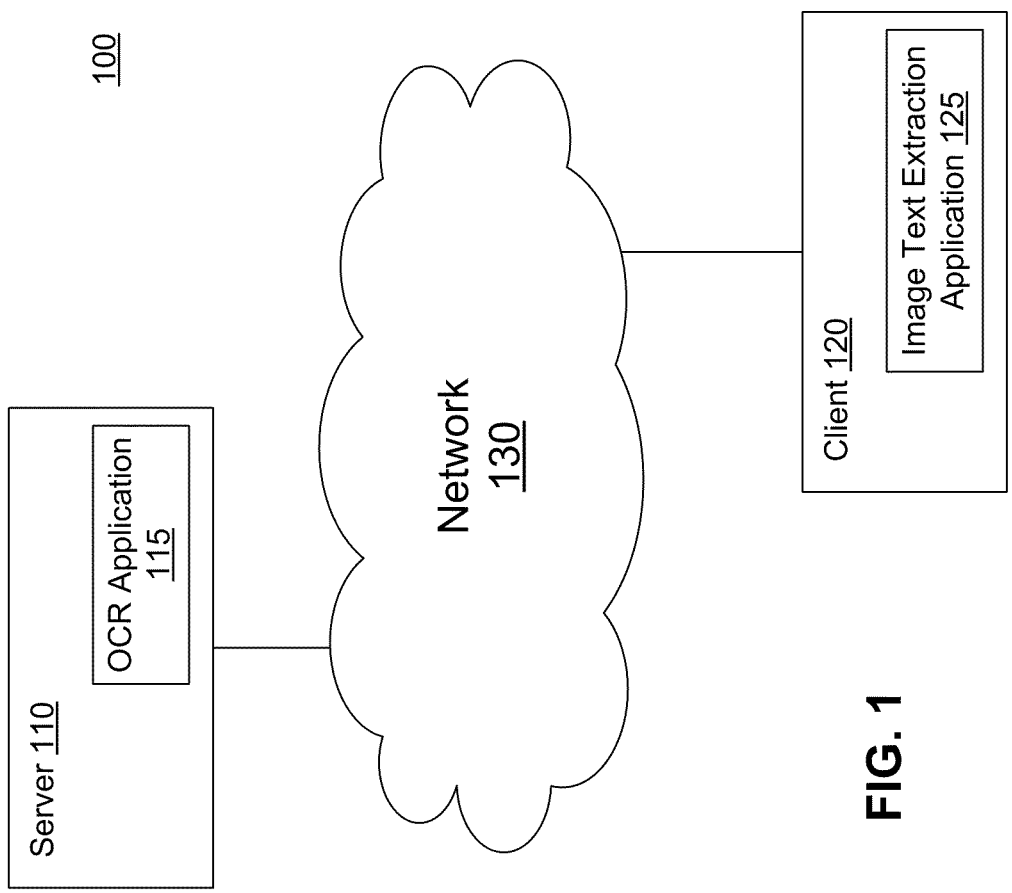
FIG. 1 is a high-level block diagram of a computing environment according to one embodiment of the present disclosure.

FIG. 1 is a high-level block diagram that illustrates a computing environment 100 for selectively recognizing text in a live video stream based on an on-screen guideline, according to one embodiment of the present disclosure. As shown, the computing environment 100 includes a server 110 and a client 120 connected through a network 130. Only one of each entity is illustrated in order to simplify and clarify the present description. There can be other entities in the computing environment 100 as well.

The server 110 is a hardware device and/or software program configured to provide clients 120 or other systems with Optical Character Recognition (OCR) functions. As shown, the server 110 includes an OCR application 115. The server 110 receives images containing text, recognizes text in the images using the OCR application 115, and returns the recognized text in a symbolic form editable by computers. An example of the server 110 is a web server that provides an OCR service.

The OCR application 115 is a hardware device and/or software program configured to convert (or translate) text inside images into the editable symbolic form (hereinafter called OCR'ed text) and evaluate a confidence in the OCR'ed text. In one embodiment, the OCR application 115 only produces OCR'ed text with acceptable confidence (i.e., for the server 110 to return to the client 120) and discards the rest.

The client 120 is a computer system configured to enable a user to select text in a live video stream through an on-screen guideline, and collaborate with the server 110 to recognize the selected text. An example of the client 120 is a mobile phone equipped with a camera (or camcorder) and a screen (i.e., a camera phone). The client 120 includes an image text extraction application 125.

The image text extraction application 125 is a hardware device and/or software program configured to provide the user with a user interface to interact with a live video stream to select text within the live video stream through an on-screen guideline. An example live video stream is the live video displayed in a camera viewfinder mode (or preview mode).

In one embodiment, an on-screen guideline is a straight line displayed at a fixed location of the screen. For example, the on-screen guideline is displayed as a horizontal bar in (or near) the middle of the screen. The length of the guideline is predetermined and adjustable. For example, the guideline can be as long as the screen width or a portion thereof (e.g., 80% of the screen width). The user can adjust the length and location of the guideline by touching an end of the guideline on the screen (i.e., a touch sensitive display) and dragging the end to a desired location. The guideline is displayed on top of (i.e., overlays) other content displayed on the screen, such as the live video stream. In one embodiment, the guideline is displayed semi-transparently, rather than in solid color.

Because the location, shape, and size of the guideline as it is displayed on the screen are fixed, the user can selectively align a line of text in the live video stream with the guideline by adjusting the camera viewpoint. The line of text can be horizontal, vertical (e.g., for text of languages such as Chinese, Japanese, and Korean that are likely printed vertically), or inclined. For example, to select an inclined line of text, the user can rotate and move the client 120 such that the inclined line of text is aligned with (e.g., parallel to and approximate to) the guideline on the screen displaying the video stream captured by the rotated camera. The image text extraction application 125 attempts to identify a text region near the on-screen guideline in each video frame (or some of the video frames) of the live video stream. If such a region is successfully identified, the image text extraction application 125 transmits the text region to the server 110 for it to recognize the text within, receives the OCR'ed text from the server 110, and provides it to the user. In one embodiment, the image text extraction application 125 is integrated with a camera (or camcorder) application on the client 120.

The network 130 enables communications between the server 110 and the client 120. In one embodiment, the network 130 uses standard communications technologies and/or protocols. Thus, the network 130 can include links using technologies such as Ethernet, 802.11, worldwide interoperability for microwave access (WiMAX), 2G/3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
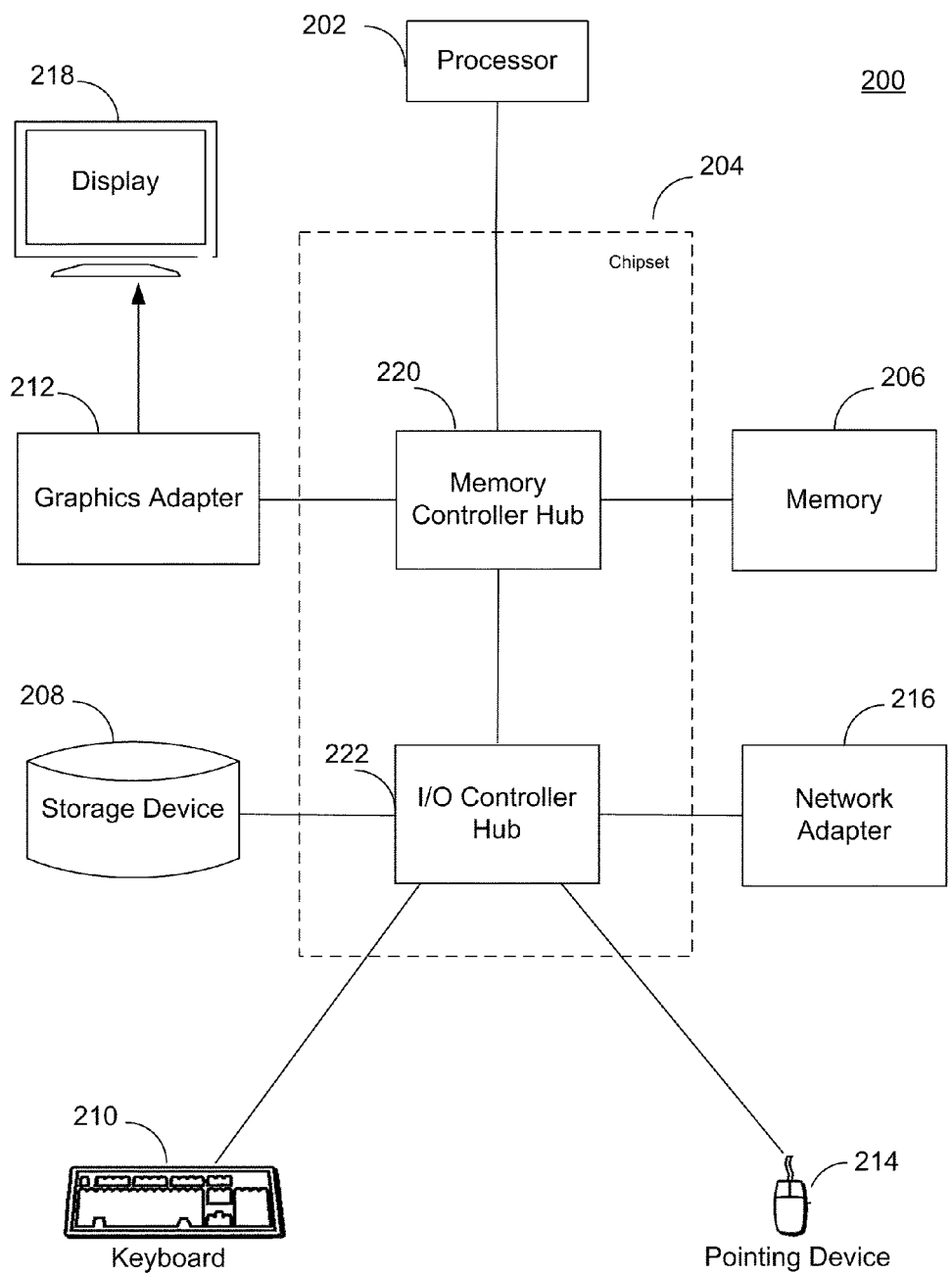
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 110 might comprise multiple blade servers working together to provide the functionality described herein. As another example, the client 120 might comprise a smartphone with limited processing power. The computers 200 can lack some of the components described above, such as keyboards 210, graphics adapters 212, and displays 218. The server 110 and/or the client 120 can also be implemented as a virtual machine (VM) or run inside a VM. In addition, the server 110 and/or the client 120 can run in a single computer 200 or multiple computers 200 communicating with each other through a network such as a server farm.

Example Architectural Overview of the OCR Application

Figure 3:
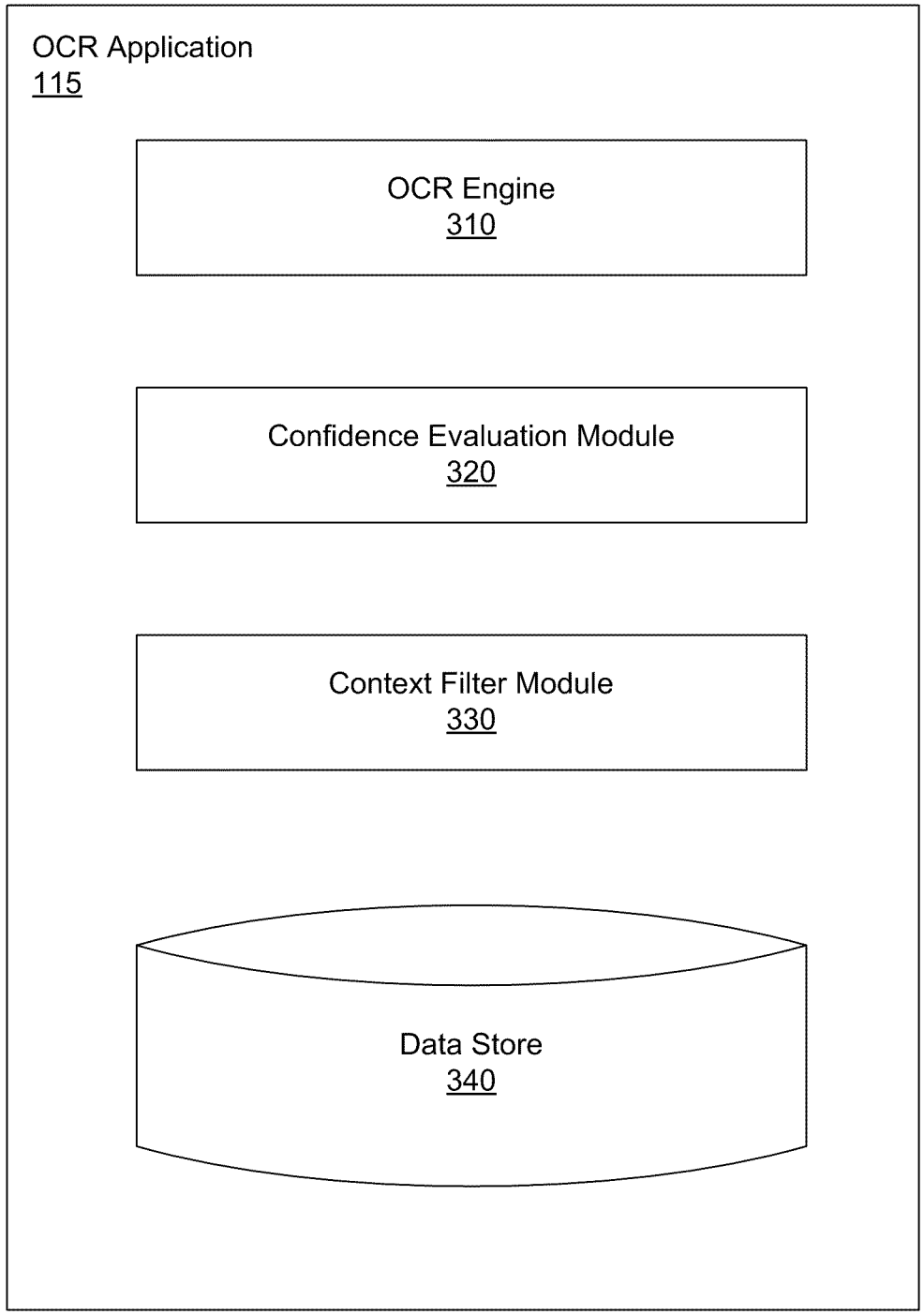
FIG. 3 is a high-level block diagram illustrating modules within an OCR application according to one embodiment of the present disclosure.

FIG. 3 is a high-level block diagram illustrating a detailed view of modules within the OCR Application 115 according to one embodiment. Some embodiments of the OCR application 115 have different and/or other modules than the ones described herein. Similarly, the functions can be distributed among the modules in accordance with other embodiments in a different manner than is described here. As illustrated, the OCR application 115 includes an OCR engine 310, a confidence evaluation module 320, a context filter module 330, and a data store 340.

The OCR engine 310 processes text images received from the client 120 using computer algorithms and generates corresponding OCR'ed text. In addition, the OCR engine 310 may generate multiple alternative OCR'ed texts for a same image. The OCR engine 310 may generate other information such as format information (e.g., font, font size, style). Examples of the OCR engine 310 include Abbyy FineReader, Nuance OmniPage, and Open Source Tesseract.

In one embodiment, the OCR engine 310 identifies one or more candidate languages for a line of text in a text image, and recognizes the line of text by applying OCR functions (or algorithms) corresponding to the identified languages. The OCR engine 310 identifies the candidate languages by analyzing the text image and associated metadata received from the client 120. One example metadata considered by the OCR engine 310 for the identification is the orientation (e.g., horizontal or vertical) of the line of text. The orientation of the line of text can be determined by the orientation of the text image, which in turn can be determined by the orientation of the client 120 when the text image was captured in the client 120. The orientation of the client 120 can be determined using an on-board gyroscope of the client 120. It is observed that text of languages such as Chinese, Japanese, and Korean are likely printed vertically. Thus, if the OCR engine 310 determines that the line of text in the image is vertical, the OCR engine 310 can identify Chinese, Japanese, and/or Korean as the candidate languages. Another example metadata considered by the OCR engine 310 for the language identification is the location of the client 120 (e.g., determined using an on-board positioning component such as a GPS). For example, if the device is located in Taiwan, then the OCR engine 310 can identify Traditional Chinese as the candidate language.

The OCR engine 310 may derive other information related to text in the text image using the associated metadata. For example, the OCR engine 310 identifies Traditional Chinese as the candidate language for the text (e.g., based on the device location). Because a line of text in Traditional Chinese can be either horizontal or vertical, the OCR engine 310 may infer an orientation of the line of text in the text image based on the orientation of the client 120. For example, if the client 120 is in portrait mode with the guideline displayed vertically, then the OCR engine 310 determines that the line of text is likely oriented in a vertical direction.

The confidence evaluation module 320 analyzes the OCR'ed text generated by the OCR engine 310 to evaluate a confidence in the OCR'ed text. The confidence evaluation module 320 calculates a confidence score that quantifies a confidence of the OCR'ed text matching the text in the text image (the original text). For example, the confidence score can be a continuous value ranging from 0 to 1, which a score of 0 indicating a very low confidence (e.g., the OCR'ed text probably mismatches the original text) and a score of 1 indicating a very high confidence (e.g., the OCR'ed text almost certainly matches the original text).

The confidence evaluation module 320 considers several factors in determining the confidence score. For example, whether the OCR'ed text contains any spelling error can serve as a confidence indicator of the OCR'ed text. If the OCR'ed text contains one or more spelling errors, then the confidence in the OCR'ed text is low since the original text in the image is probably spelling error free and the error(s) is probably introduced by the OCR engine 310. The confidence evaluation module 320 can also use text suggestion services such as auto-complete to evaluate the confidence in the OCR'ed text. For example, if the OCR'ed text matches the predicted word or phrase based on a portion of the OCR'ed text, then the confidence in the OCR'ed text is high. The confidence evaluation module 320 may also consider other factors such as the similarity and/or relevancy of the OCR'ed text to previously generated OCR'ed text for images from the same client 120. For example, if the OCR'ed text matches a previously generated OCR'ed text, then it is likely that the corresponding images are different video frames of a same video stream and contain a same text image, and therefore the confidence in the OCR'ed text is high.

In one embodiment, the confidence evaluation module 320 only returns OCR'ed text to the client 120 if the level of confidence is acceptable. For example, the confidence evaluation module 320 can compare the confidence score of the OCR'ed text with a predetermined threshold value, and only produce the OCR'ed text if the corresponding confidence score exceeds the threshold value. The confidence score may be transmitted to the client 120 along with the OCR'ed text.

The context filter module 330 analyzes the OCR'ed text generated by the OCR engine 310 to determine whether it has proper context. In one embodiment, the context filter module 330 filters out OCR'd text with improper context, and only returns those with proper context to the client 120. The context filter module 330 matches the OCR'ed text with texts in sources such as a dictionary, a name database, a phone number list, and a list of valid Uniform Resource Locators (URLs), and determines the context of the OCR'ed text based on the matching results. For example, if the OCR'ed text contains a name associated with one entity (e.g., location, company, person) and a phone number (or URL) associated with another unrelated entity, the context filter module 330 determines that the context is improper.

The data store 340 stores data used by the OCR application 115. Examples of such data include received text images, generated OCR'ed text and associated information (e.g., confidence scores), and information about the client 120. The data store 340 may be a relational database or any other type of database.

Example Architectural Overview of the Image Text Extraction Application

Figure 4:
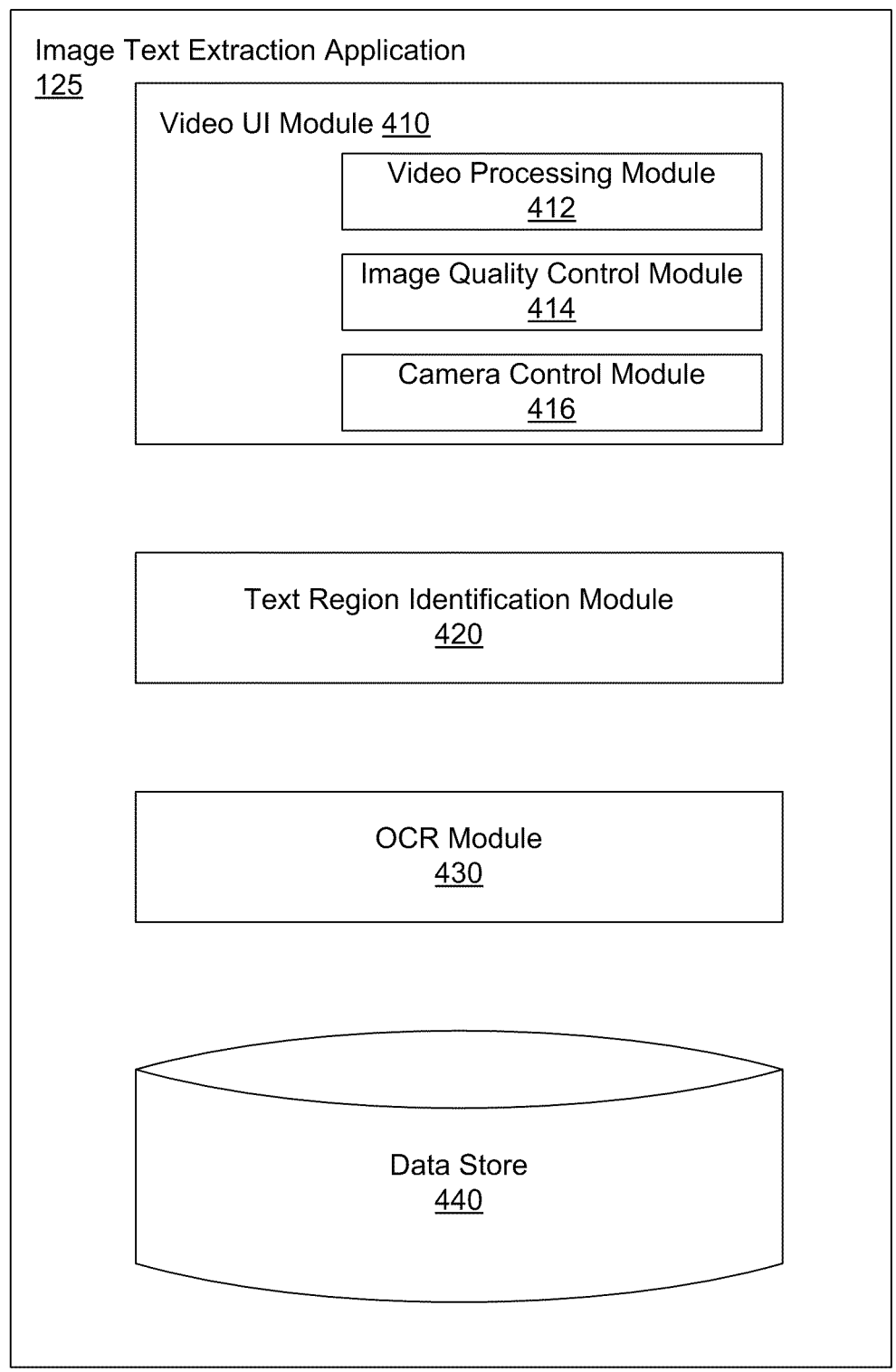
FIG. 4 is a high-level block diagram illustrating modules within an image text extraction application according to one embodiment of the present disclosure.

FIG. 4 is a high-level block diagram illustrating a detailed view of modules within the image text extraction application 125 according to one embodiment. Some embodiments of the image text extraction application 125 have different and/or other modules than the ones described herein. Similarly, the functions can be distributed among the modules in accordance with other embodiments in a different manner than is described here. As illustrated, the image text extraction application 125 includes a video User Interface (UI) module 410, a text region identification module 420, an OCR module 430, and a data store 440.

The video UI module 410 provides a user interface for the user to interact with a live video stream captured by an on-device camera to select text within the live video stream through an on-screen guideline overlaying the live video stream. The user selects a line of text within the live video stream by adjusting the viewpoint of the camera capturing the live video stream to align the text with the guideline (e.g., parallel to and approximate to the guideline). The user can also perform camera operations such as zooming to align the text with the guideline. In one embodiment, the user interface allows the user to adjust the width and/or position of the on-screen guideline through controls such as a trackball and, if the display is a touch sensitive display, through a gesture on the display. As shown, the video UI module 410 includes a video processing module 412, an image quality control module 414, and a camera control module 416.

The video processing module 412 processes the live video stream for an optimal display on the client 120. The video processing module 412 optimizes the video stream based on its properties (e.g., size, color, sharpness) and properties of the screen (e.g., resolution, color depth). For example, the video processing module 412 resizes the video stream to fit the screen, tunes the image color based on the color depth of the screen, and/or adjusts other attributes of the video stream such as its sharpness for an optimal display on the screen.

The image quality control module 414 analyzes video frames in the live video stream to evaluate their image quality, and identifies video frames with acceptable quality for further processing. The image quality control module 414 calculates a quality score for a video frame and identifies the video frame only if the quality score exceeds a predetermined threshold value. The image quality control module 414 calculates the quality score based on image quality factors such as sharpness, brightness, and contrast of the video frame. In one embodiment, the quality score of a video frame measures the image quality of a portion of the video frame displayed (or to be displayed) approximate to (e.g., covered by and near) the on-screen guideline. The image quality control module 414 can analyze all or some of the video frames in the live video stream. For example, the image quality control module 414 can sample video frames at a fixed sampling rate (e.g., 1 video frame per 0.1 second).

The camera control module 416 controls the camera to improve image quality of the video frames in the live video stream. The camera control module 416 can adjust the on-device camera based on the image quality analysis conducted by the image quality control module 414. For example, assuming the image quality analysis indicates that recent video frames have poor image sharpness, the camera control module 416 can modify the shutter speed (the amount of time the sensor is exposed to light), aperture (the size of the lens opening that lets light into the camera), and/or focus of the camera to enhance the sharpness of subsequently captured video frames. As another example, the camera control module 416 can apply an image stabilization mechanism to compensate for camera-shakes.

The camera control module 416 can utilize signals from various components of the client 120 to control the camera for enhanced image quality. For example, the camera control module 416 can detect device motion (e.g., acceleration) of the client 120 through an on-board accelerometer, and adjust the focus of the camera accordingly. If the client 120 is detected to move forward/backward at a particular acceleration, the camera control module 416 can reduce/increase the focus to compensate such movement. Alternatively, the camera control module 416 can be configured to not to attempt focusing when substantial device motion is detected.

The text region identification module 420 attempts to identify a text region aligned with the on-screen guideline in a video frame having acceptable quality. The text region identification module 420 analyzes an area of the video frame displayed approximate to (e.g., covered by or near) the on-screen guideline to detect the presence of a line of text. If the line of text is successfully detected, the text region identification module 420 identifies a portion of the video frame that includes the line of text as the text region. An example of the text region is a rectangular-shaped bounding box containing the detected line of text. In one embodiment, the text region identification module 420 determines whether the detected line of text is skewed in the video frame, and corrects the skew before identifying the text region.

The text region identification module 420 crops the text region from the video frame by removing the portions outside the text region, and provides the cropped image to the OCR module 430 for further processing. Because the cropped image contains only the text in which the user expressed interest through the on-screen guideline, the cropped image is much smaller in size compared to the video frame and contains only information relevant to the user's interest. If no text region is identified (e.g., no text is detected near the on-screen guideline), the text region identification module 420 discards the video frame without providing it to the OCR module 430.

In one embodiment, the appearance of the on-screen guideline is affected by whether a text region is identified in the displayed video frame. For example, if the text region is successfully identified, the guideline is displayed in green color, and otherwise in red color (or any other color that is visually distinctive from green). The user can thus use the color of the guideline as a clue for whether the text of interest is successfully selected, and reposition the on-device camera as needed. The boundary of the identified text region can also be shown on the video frame.

The OCR module 430 converts text in the cropped image into editable text. The OCR module 430 transmits the cropped image to the server 110 for processing using OCR technology, and receives the resulting OCR'ed text from the server 110. In one embodiment, instead of or in addition to transmitting the cropped image, the OCR module 430 can transmit the original video frame together with co-ordinates of the identified text region to the server 110. In another embodiment, the OCR module 430 itself may provide OCR functions and can convert the cropped image into OCR'ed text locally. The OCR module 430 makes the OCR'ed text available to the user or feeds it to a relevant service or application (e.g., text search).

The data store 440 stores data used by the image text extraction application 125. Examples of such data include the video frames, the cropped images and/or co-ordinates, the OCR'ed text and associated information (e.g., confidence scores), and information about the server 110. Similar to the data store 340, the data store 440 may be a relational database or any other type of database.

Skew Detection and Correction

As described above, the user can align a line of text in the live video stream with the guideline by adjusting the camera viewpoint. However, the line of text in the adjusted video stream may nevertheless deviate from an orientation of the guideline. The angular deviation (also called skew) can be caused by factors such as the angle of the camera viewpoint and camera shake. The skew can be expressed numerically as the deviation angle (also called skew angle). The presence of skew makes identifying and cropping a text region including the line of text difficult and may cause errors in the subsequent OCR process. Therefore, it is beneficial to detect and correct the skew for the user-selected text region.

In one embodiment, the text region identification module 420 detects skew by calculating projection profiles at a range of angles for an area surrounding the on-screen guideline. The surrounding area can be defined as a rectangular box covering the guideline. The extent and relevant position of the surrounding area can be pre-defined and user-configured. For example, the top boundary of the rectangular box can be defined by a straight line parallel to the guideline and 30 (or 10% of the horizontal pixels of the display) pixels above. The other boundaries can be similarly defined.

A projection profile for the surrounding area at a particular angle is obtained by projecting the foreground pixels (i.e., pixels with a color different from the background) in the surrounding area on to an axis perpendicular to the angle. Each pixel line in parallel with the angle is represented on the projection profile by the number of foreground pixels on that line.

In order to detect the skew angle, the text region identification module 420 calculates projection profiles for a range of angles. For example, assuming the on-screen guideline is parallel to the horizontal axis of the screen, the text region identification module 420 can calculate angles within the range ±15° with 1° interval. In this example, projection profiles for thirty-one angles (i.e., −15°, . . . , 0°, . . . , +15°) are calculated.

The projection parallel to the true alignment of a line of text is likely to have the maximum variance, since when parallel, each projected pixel either includes almost no foreground pixels (as it passes above or below the line of text) or many foreground pixels (while passing through the line of text). Therefore, the horizontal projection profile of the line of text is the projection profile with the most variance. Accordingly, the skew angle of the line of text is the angle of the horizontal projection profile. The presence of such variance in a projection profile can also be used by the text region identification module 420 to detect the presence of a line of text.

The text region identification module 420 corrects the skew by rotating the video frame (or the surrounding area) to compensate for the skew angle (i.e., to an opposite direction). The image rotation can be achieved by performing a coordinate transformation.

Text Region Identification

The text region identification module 420 identifies a text region in the surrounding area containing the line of text displayed approximate to the on-screen guideline. As described above, the horizontal projection profile of the line of text has substantial variance between the pixel lines above and below the line of text and the pixel lines passing through it. The text region identification module 420 can use the pixel lines immediately above and below the line of text as the top and bottom boundaries of the text region containing the line of text.

The text region identification module 420 determines a left boundary and a right boundary of the text region by calculating a vertical projection profile (i.e., the projection profile of an angle perpendicular to the angle of the horizontal projection profile described above) of the surrounding area between the top and bottom boundaries. The vertical projection profile is characterized by a set of upright and tall peaks, between which are the character spacing (or word spacing). The text region identification module 420 determines the leftmost spacing as the left boundary, and similarly determines the rightmost spacing as the right boundary.

Overview of Methodology for the Image Text Extraction Application

Figure 5:
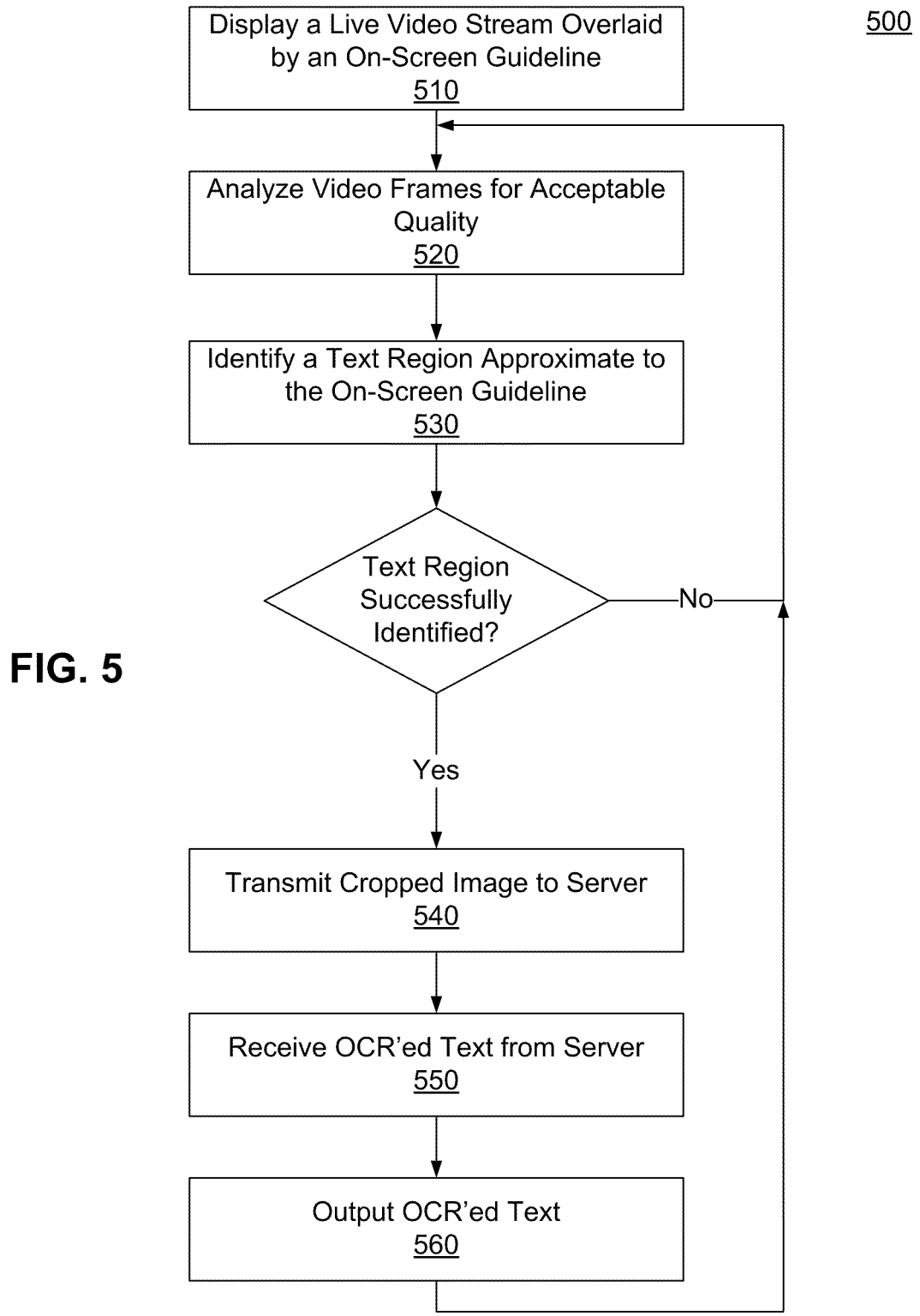
FIGS. 5 and 6 are flow diagrams collectively illustrating a process for selectively recognizing text in a live video stream based on an on-screen guideline according to one embodiment of the present disclosure.

FIG. 5 is a flowchart illustrating a method 500 for the image text extraction application 125 to selectively recognize text in a live video stream based on an on-screen guideline, according to one embodiment. Other embodiments can perform the steps of the method 500 in different orders. Moreover, other embodiments can include different and/or additional steps than the ones described herein.

Initially, the image text extraction application 125 displays 510 a live video stream captured by an on-device camera on a screen overlaid by a horizontal on-screen guideline located in (or near) the middle of the screen. In one example, the live video stream is the video in a camera viewfinder mode. The user can selectively align a line of text in the live video stream with the on-screen guideline by adjusting the camera viewpoint.

The image text extraction application 125 analyzes 520 the displayed video frames for video frames with acceptable quality, and identifies 530 text regions approximate to the on-screen guideline in the video frames with acceptable quality. The identifying step 530 is illustrated in FIG. 6 and described in detail below.

Figure 6:
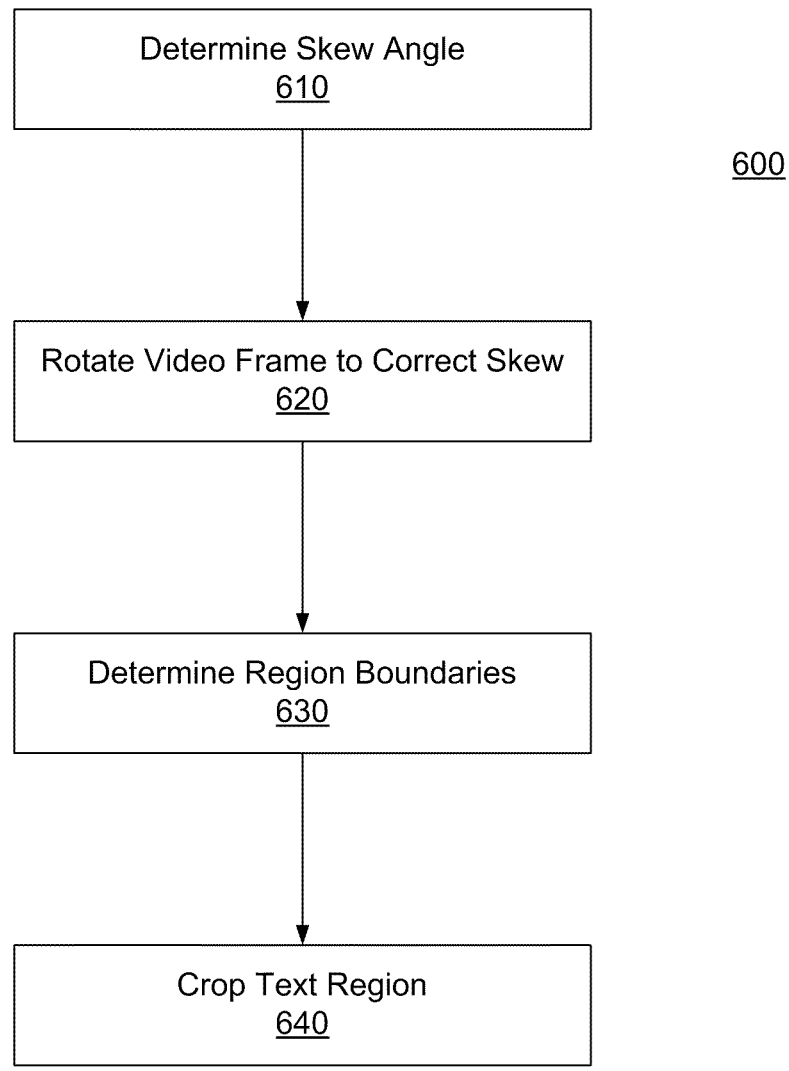

Referring now to FIG. 6, a flowchart illustrating a method 600 for the image text extraction application 125 to identify a text region in a video frame based on an on-screen guideline, according to one embodiment. As shown, the image text extraction application 125 determines 610 a skew angle of a line of text approximate to the guideline. The image text extraction application 125 can make the determination 610 by calculating projection profiles of a surrounding region in a range of angles (e.g., ±15°), and use the angle of the projection profile with the most variance (i.e., the horizontal projection profile) as the skew angle.

The image text extraction application 125 rotates 620 the video frame (or the surrounding region) to correct the skew.

The image text extraction application 125 determines 630 boundaries of a text region in the rotated video frame, and crops 640 the text region.

Referring back to FIG. 5, if no text region is identified 530, the image text extraction application 125 discards the video frame and analyzes 520 a subsequent video frame. Otherwise, if a text region is successfully identified 530, the image text extraction application 125 transmits 540 the cropped image containing the text region to the server 110, which processes the cropped image using OCR technology and returns OCR'ed text. In one embodiment, the image text extraction application 125 transmits associated metadata together with the cropped image to the server 110. Examples of the metadata include the orientation of the cropped image (e.g., horizontal or vertical), which can be determined by the orientation of the client 120 as indicated by an on-board gyroscope, and the location of the client 120.

The image text extraction application 125 receives 550 the OCR'ed text from the server 110 and outputs 560 the OCR'ed text. For a particular cropped image transmitted 540 to the server 110, the image text extraction application 125 may receive zero, one, or multiple OCR'ed texts along with their confidence scores. The image text extraction application 125 then repeats the process by analyzing 520 a subsequent video frame.

For example, the image text extraction application 125 can display the recognized text to the user (e.g., next to or overlaying the live video stream) for selection or confirmation. The image text extraction application 125 can dynamically display the received OCR'ed text in a scrolling list as candidate texts for user selection. The image text extraction application 125 uses the candidate OCR'ed text selected by the user as the recognized text of the text region.

The image text extraction application 125 may also output 560 the OCR'ed text to other functions or services available on the client 120. For example, the image text extraction application 125 may store the OCR'ed text in a clipboard such that the user can paste the text elsewhere (e.g., onto a text input box). As another example, the image text extraction application 125 may feed the OCR'd text to a search engine (e.g., GOOGLE SEARCH) for relevant information (e.g., articles, images).

The image text extraction application 125 may also analyze the OCR'ed text to determine its nature, and then feed it to relevant applications. For example, if the text comprises an address, then the image text extraction application 125 can feed the text to a mapping application (e.g., GOOGLE MAP) such that the mapping application can display a local map or provide routing service based on a current location of the client 120 and the address.

The image text extraction application 125 may change the appearance of the on-screen guideline based on the outcome of the identifying step 530. For example, when the image text extraction application 125 fails to detect text approximate to the on-screen guideline, the guideline can be displayed in red color. When the image text extraction application 125 successfully detects text near the guideline and identifies a text region including the detected text, the image text extraction application 125 can display the on-screen guideline in green color, suggesting to the user that the text of interest is successfully selected.

Overview of Methodology for the OCR Application

Figure 7:
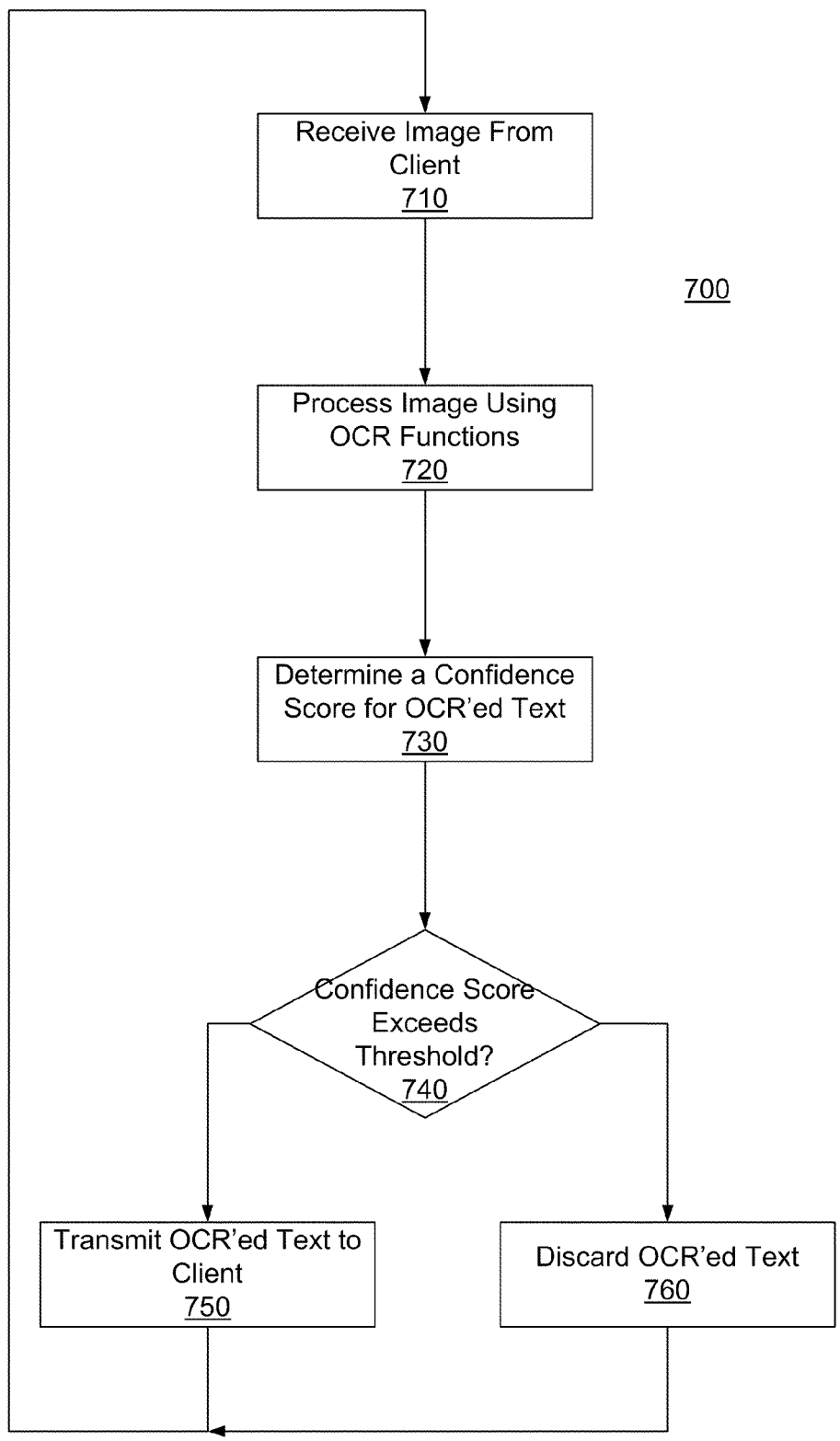
FIG. 7 is a flow diagram illustrating a process for converting text inside images into OCR'ed text according to one embodiment of the present disclosure.

FIG. 7 is a flowchart illustrating a method 700 for the OCR application 115 to convert text inside images received from a client 120 into OCR'ed text, according to one embodiment. Other embodiments can perform the steps of the method 700 in different orders. Moreover, other embodiments can include different and/or additional steps than the ones described herein.

The OCR application 115 receives 710 an image (e.g., an image cropped from a video frame) from the image text extraction application 125, processes 720 the image using OCR functions for OCR'ed text, and determines 730 a confidence score for the OCR'ed text. The OCR application 115 compares 740 the confidence score with a predetermined threshold value. If the confidence score exceeds the threshold value, the OCR application 115 considers the OCR'ed text satisfying and transmits 750 the OCR'ed text back to the image text extraction application 125. Otherwise, the OCR application 115 discards 760 the OCR'ed text. The OCR application 115 then repeats the process 700 by receiving 710 a subsequent image from the image text extraction application 125.

Example Client Operation

Figure 8E:
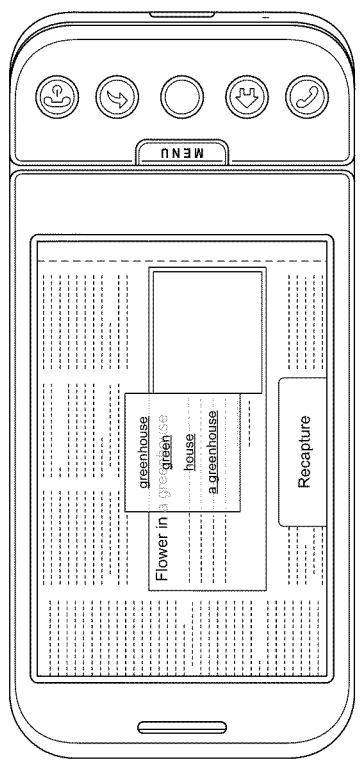
Figure 8F:
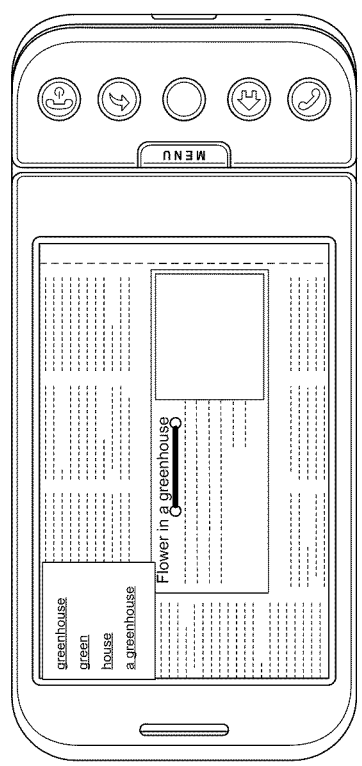

FIGS. 8A through 8F illustrate an example operation of the client 120 to adjust an on-screen guideline based on user input and to selectively recognize text in a live video stream based on the on-screen guideline. As illustrated in FIG. 8A, a camera phone (e.g., a T-MOBILE G1 PHONE) displays 510 a live video stream in a camera viewfinder mode. The video frame being displayed includes a portion of an article and is overlaid by a horizontal on-screen guideline. The user can optionally adjust the length of the guideline by dragging an end point of the guideline, as illustrated in FIGS. 8B and 8C. The image text extraction application 125 identifies 530 a text region approximates to the adjusted guideline. Once the image text extraction application 125 successfully identifies 530 the text region, the image text extraction application 125 changes the guideline from grey (or red) to black (or green), as illustrated in FIG. 8D. The image text extraction application 125 transmits 540 a cropped image including the identified text region to the server 110 and receives 550 OCR'ed text recognized in the text region. The image text extraction application 125 displays the received text to the user for selection or confirmation. The OCR'ed text can be prominently displayed in the center for easy user selection, as illustrated in FIG. 8E, or displayed near the corner without blocking the center view of subsequent video frames, as illustrated in FIG. 8F.

Even though the example illustrated in FIGS. 8A through 8F shows selecting English text based on the on-screen guideline, the present disclosure can be utilized to recognize text of other languages, such as Chinese, Japanese, and Korean, to name a few.

Additional Embodiments

In one embodiment, the OCR application 115 and the image text extraction application 125 reside on a single device (e.g., a smartphone), such that the device can selectively recognize text in a live video stream based on an on-screen guideline without communicating with any external computing device.

In one embodiment, the on-screen guideline can be displayed implicitly or hidden. The user can activate or manipulate the hidden guideline through various gestures on a touch sensitive display, such as drawing a line approximate to the target text or drawing a circle around the target text. The image text extraction application 125 can derive the guideline (e.g., the location, length, and orientation of the guideline) from the shape and location of the user gesture.

Figure 9A:
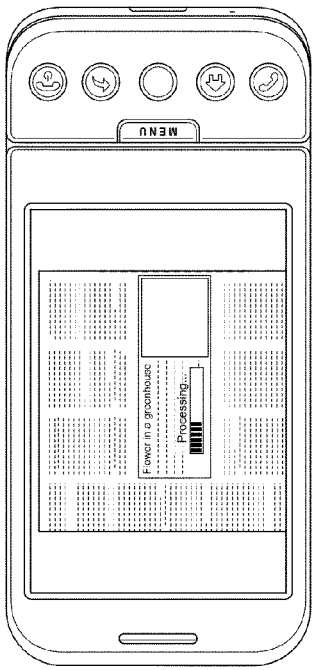
FIGS. 9A through 9D are diagrams illustrating an example of selectively recognizing text in a live video stream based on a hidden on-screen guideline according to one embodiment of the present disclosure.
Figure 9C:
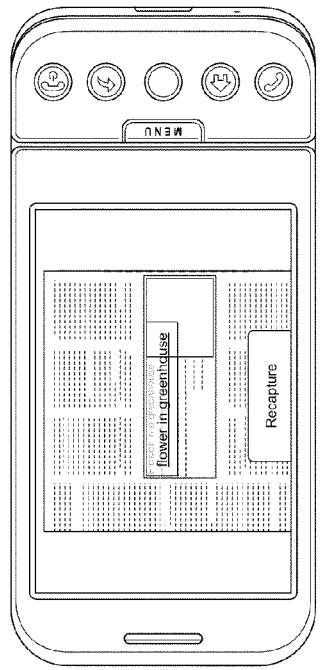
Figure 9B:
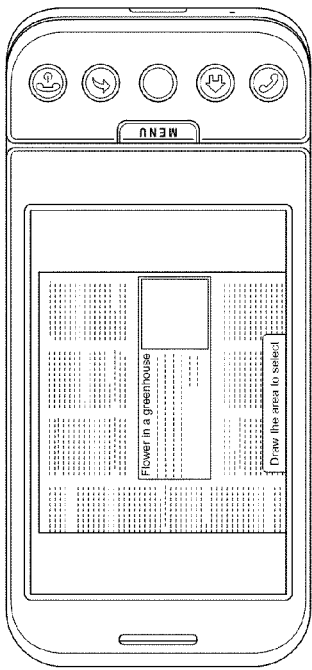
Figure 9D:
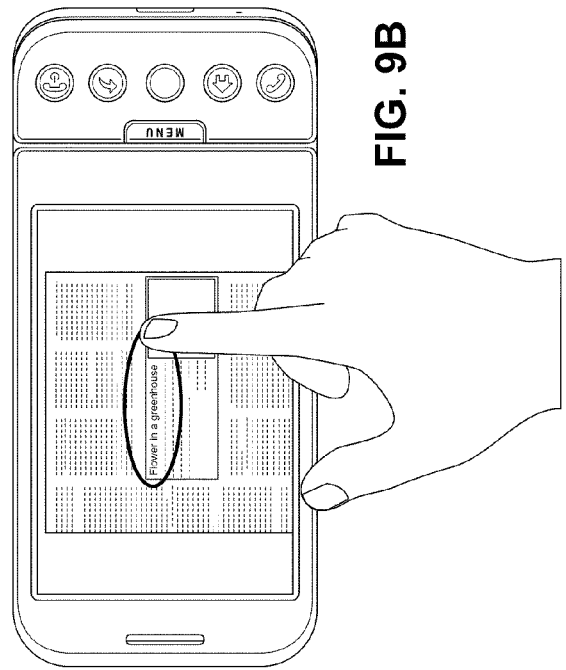

FIGS. 9A through 9D illustrate a process for a user to activate a hidden on-screen guideline for selectively recognizing text of the user's interest. As shown in FIG. 9A, a smartphone (e.g., a T-MOBILE G1 PHONE) displays a portion of an article. The article includes an embedded picture and accompanying descriptions. FIG. 9B shows that the user circles the text line "Flower in a greenhouse" on the display. FIG. 9C shows an intermediate display generated by the image text extraction application 125 indicating that it is processing the user selection. FIG. 9D shows that the text "flower in greenhouse" is recognized in the text image circled by the user. The user can either accept the recognized text (e.g., by touching the underlined text) or request the image text extraction application 125 to try again (e.g., by selecting the "Recapture" button displayed on the bottom). If the user accepts the recognized text, the accepted text can be output to other functions or services (e.g., clipboard). If the user requests the image text extraction application 125 to recapture, the image text extraction application 125 attempts to recognize text (e.g., in the same area the user circled) in a subsequent video frame.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selectively recognizing text in live video streams based on an on-screen guideline. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for selectively recognizing text in a live video stream, comprising:
   receiving a video frame from a camera in real time;
   displaying a guideline overlaid on the video frame on a display device;
   identifying a text region in the video frame associated with the guideline, the text region comprising text; and
   converting the text in the text region into an editable symbolic form, the converting comprising:
      identifying a candidate language for a line of text in the text region based at least in part on an orientation of the line of text;
      using OCR functions associated with the candidate language to determine a plurality of candidate texts in the editable symbolic form;
   displaying the plurality of candidate texts;
   receiving a user selection of one of the plurality of candidate texts; and
   identifying the selected candidate text as the converted text for the text region.

2. The computer-implemented method of claim 1, wherein identifying the text region comprises identifying the text region in the video frame approximate to the guideline.

3. The computer-implemented method of claim 1, further comprising:
   cropping the video frame to produce a cropped image including the text region;
   wherein converting the text comprises:
      transmitting the cropped image to an OCR engine through a computer network; and
      receiving the text in the editable symbolic form from the OCR engine through the computer network.

4. The computer-implemented method of claim 1, wherein converting the text comprises:
   transmitting the video frame and location information about the text region in the video frame to an OCR engine through a computer network; and
   receiving the text in the editable symbolic form from the OCR engine through the computer network.

5. The computer-implemented method of claim 1, wherein identifying the text region in the video frame comprises:
   determining a skew angle of the text;
   correcting the skew angle by rotating at least a portion of the video frame including the text; and
   identifying the text region in the at least a portion of the video frame.

6. The computer-implemented method of claim 5, wherein determining the skew angle of the text comprises:
   calculating a plurality of projection profiles of a plurality of angles for the at least a portion of the video frame;

identifying a horizontal projection profile in the plurality of projection profiles based on variances of the plurality of projection profiles; and determining the skew angle based on an angle of the horizontal projection profile.

7. The computer-implemented method of claim 1, further comprising:

analyzing the video frame to determine a quality score that measures an image quality of the video frame;

wherein identifying the text region comprises, responsive to the quality score exceeding a predetermined threshold value, identifying the text region in the video frame associated with the guideline.

8. The computer-implemented method of claim 7, further comprising:

controlling the camera to improve image qualities of subsequent video frames based on the image quality.

9. The computer-implemented method of claim 8, wherein controlling the camera comprises modifying, responsive to a poor sharpness of the video frame, at least one of the following: a shutter speed, an aperture, and a focus of the camera.

10. The computer-implemented method of claim 1, further comprising:

determining a motion of the camera based on an on-board accelerometer; and adjusting the camera based at least in part on the determined camera motion.

11. The computer-implemented method of claim 10, wherein adjusting the camera comprises at least one of the following: adjusting a focus of the camera, applying an image stabilization mechanism.

12. The computer-implemented method of claim 1, wherein identifying the text region in the video frame further comprises:

detecting the text approximate to the guideline; and responsive to successfully detecting the text approximate to the guideline, identifying the text region in the video frame associated with the guideline.

13. The computer-implemented method of claim 1, further comprising:

responsive to successfully identifying the text region in the video frame, displaying the guideline in a first color; and responsive to a failure to identify the text region in the video frame, displaying the guideline in a second color visually distinctive from the first color.

14. The computer-implemented method of claim 1, further comprising:

displaying the text in the editable symbolic form along with texts converted from other video frames received from the camera for a user selection.

15. A non-transitory computer-readable storage medium encoded with executable computer program code for selectively recognizing text in a live video stream, the computer program code comprising program code for:

receiving a video frame from a camera in real time;

displaying a guideline overlaid on the video frame on a display device;

identifying a text region in the video frame associated with the guideline, the text region comprising text; and converting the text in the text region into an editable symbolic form, the converting comprising:

identifying a candidate language for a line of text in the text region based at least in part on an orientation of the line of text;

using OCR functions associated with the candidate language to determine a plurality of candidate texts in the editable symbolic form;

displaying the plurality of candidate texts;

receiving a user selection of one of the plurality of candidate texts; and identifying the selected candidate text as the converted text for the text region.

16. A computer system for selectively recognizing text in a live video stream, comprising:

a computer-readable storage medium comprising executable computer program code for:

a video User Interface (UI) module for receiving a video frame from a camera in real time and displaying a guideline overlaid on the video frame on a display device;

a text region identification module for identifying a text region in the video frame associated with the guideline, the text region comprising text; and an OCR module for:

converting the text in the text region into an editable symbolic form, the converting comprising:

identifying a candidate language for a line of text in the text region based at least in part on an orientation of the line of text;

using OCR functions associated with the candidate language to determine a plurality of candidate texts in the editable symbolic form;

displaying the plurality of candidate texts;

receiving a user selection of one of the plurality of candidate texts; and identifying the selected candidate text as the converted text for the text region.

17. A computer-implemented method for converting text in a series of received images into text in an editable symbolic form, comprising:

receiving a series of images from a client, the series of images comprising a first image;

processing the first image using OCR functions to generate text in the editable symbolic form;

determining whether the generated text includes a spelling error;

determining a confidence score for the generated text based on text generated for other images in the series of images received from the client, the confidence score being higher if the generated text does not include a spelling error than if the generated text includes a spelling error; and responsive to the confidence score exceeding a threshold value, transmitting the generated text to the client.

18. The computer-implemented method of claim 17, wherein the confidence score for a generated text matching at least one of the previously generated text for the other images in the series of images received from the client is higher than the confidence score for a generated text mismatching all of the previously generated text for the other images in the series of images received from the client.

19. The computer-implemented method of claim 17, further comprising:

generating a predicted word using a portion of the generated text, wherein the confidence score for a generated text matching the associated predicted word is higher than the confidence score for a generated text mismatching the associated predicted word.

20. The computer-implemented method of claim 17, further comprising:

identifying a candidate language for a line of text in the first image based at least in part on an orientation of the line of text, wherein processing the first image comprises processing the first image using
OCR functions associated with the candidate language to generate text in the editable symbolic form.

21. The computer-implemented method of claim 20, wherein identifying the candidate language comprises identifying, responsive to the line of text being vertical, at least one of the following languages as the candidate language: Chinese, Japanese, Korean.

22. The computer-implemented method of claim 17, wherein processing the first image using OCR functions to generate text in the editable symbolic form comprises generating a plurality of candidate texts in the editable symbolic form, wherein determining the confidence score for the generated text comprises determining a confidence score for each of the plurality of candidate texts to quantify a confidence of the candidate text matching text in the first image, and wherein transmitting the generated text to the client comprises responsive to candidate scores of one or more of the plurality of candidate texts exceeding the threshold value, transmitting the one or more of the plurality of candidate texts to the client in response to the first image.

23. A non-transitory computer-readable storage medium encoded with executable computer program code for converting text in a series of received images into text in an editable symbolic form, the computer program code comprising program code for:
receiving a series of images from a client, the series of images comprising a first image;
identifying a candidate language for a line of text in the first image based at least in part on an orientation of the line of text;
processing the first image using OCR functions associated with the candidate language to generate text in the editable symbolic form;
determining a confidence score for the generated text based on text generated for other images in the series of images received from the client; and
responsive to the confidence score exceeding a threshold value, transmitting the generated text to the client in response to the series of images.

24. A computer system for converting text in a series of received images into text in an editable symbolic form, comprising:
a computer-readable storage medium comprising executable computer program code for:
an OCR engine for:
receiving a series of images from a client, the series of images comprising a first image, and
processing the first image using OCR functions to generate a plurality of candidate texts in the editable symbolic form; and
a confidence evaluation module for:
determining a confidence score for each of the plurality of generated candidate texts based on text generated for other images in the series of images received from the client to quantify a confidence of the candidate text matching text in the first image, and
transmitting ones of the generated candidate texts to the client in response to the confidence scores of the ones of the candidate texts exceeding a threshold value.

25. The computer-implemented method of claim 1, wherein each of the candidate texts is associated with a confidence score quantifying a confidence of the candidate text matching the text in the text region.

* * * * *